United States Patent Office 3,278,145
Patented Oct. 11, 1966

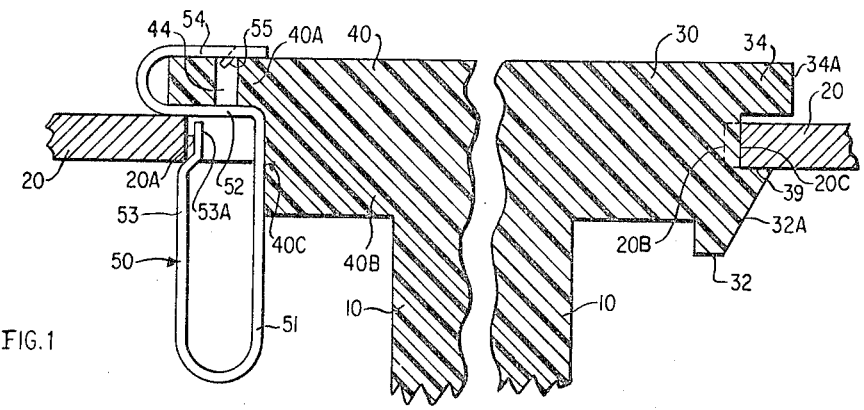
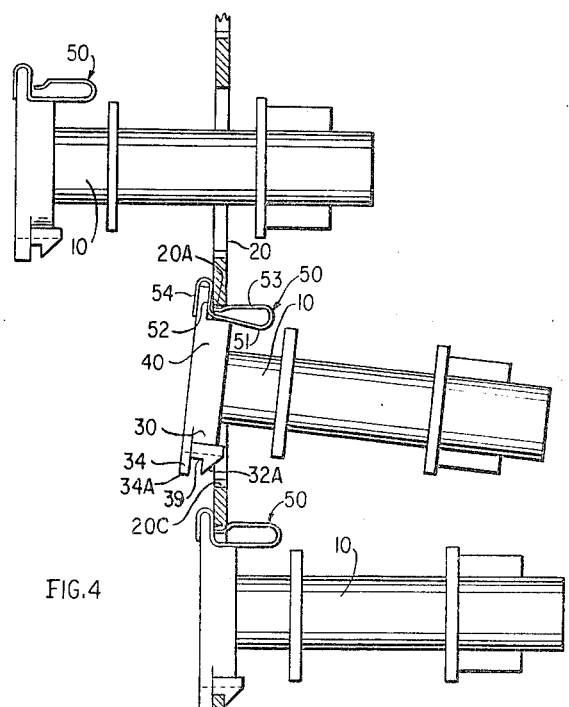
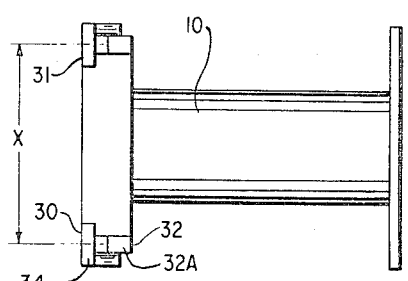
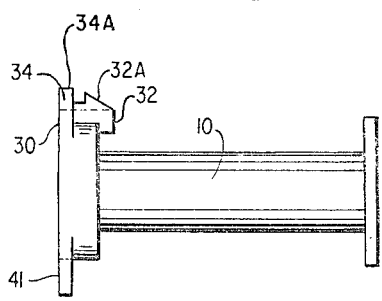
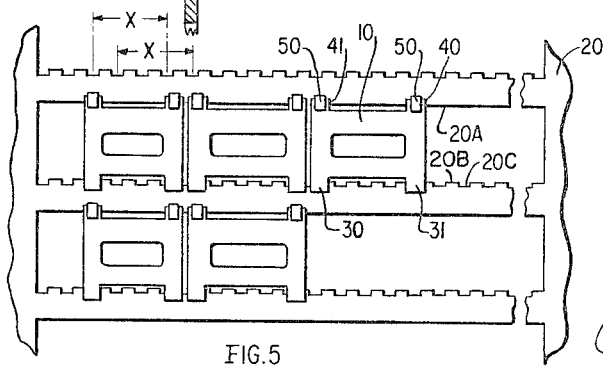

3,278,145
MOUNTING ARRANGEMENT
Richard A. Leshuk, Ann Arbor, Mich., assignor to Automatic Electric Laboratories, Inc., Northlake, Ill., a corporation of Delaware
Filed Dec. 23, 1964, Ser. No. 420,596
4 Claims. (Cl. 248—27)

This invention relates to mounting arrangements, and more particularly to an arrangement for mounting electromagnetic devices, such as relays to a panel or board.

Heretofore, it was common practice to mount relays on a panel through the use of screws, and while this was satisfactory in many respects, it did require the careful alignment of holes and the use of special tools. Moreover, this scheme was not advantageous from the standpoint of removing the relays from the panel for repair, and it has no provision against shock and vibration as the relays were rigidly secured to the panel.

Therefore, a principal object of the invention is to provide an arrangement for mounting electromagnetic devices with a minimum amount of effort.

Another object of the invention is to provide an arrangement for mounting relays which include provisions for damping the adverse effects of shock and vibration to the panel.

Still another object of the invention is to provide an arrangement for mounting electromagnetic devices which is economical and avoids the need for special tools.

Still another object of the invention is to provide an arrangement for mounting relays which avoids interference with the electrical connections of the relay.

The invention features a relay frame structure or a base and a panel having a corresponding opening wherein the relay can be snapped into position by hand. One side of the relay base is held in position through a pair of flange members with grooves which receive an edge of the opening. The other side of the base has another pair of integrally formed flange members. These support springs which have two divergent portions, one portion is attached or connected to the corresponding flange member and the other receives or holds onto an opposite edge of the panel opening. The combination of the opening in the panel, the grooves in the flange members, and the springs constitute therefore the means whereby a relay, for instance, can be mounted on a panel.

The springs are arranged and constructed so that the relay can be snapped into position on the panel, and can be removed upon first moving the relay laterally and then axially in an outward direction in from the panel.

One edge of the opening in the panel includes notches having a width substantially the same as a portion of the corresponding flange member. The notches prevent side lateral movement of the relay once it is snapped into position. Furthermore, the notches are on centers which enable the relay to be locked into position regardless where in the opening it is placed.

These and other objects and features of the invention will become apparent from a perusal of the following detailed description which makes reference to the accompanying drawings of which:

FIG. 1 is a view in cross section showing the mounting arrangement according to the invention;

FIG. 2 shows a front view of a frame structure with spaced flange members according to the invention.

FIG. 3 is a side view of the frame structure shown in FIGS. 1 and 2.

FIG. 4 is a cross-sectional side view showing the progressive steps for mounting a relay on a panel; and FIG. 5 is a plan view of a panel wherein a number of relays are mounted according to the arrangement of the invention.

Referring now to the drawings, FIGURE 1 illustrates the mounting arrangement in cross section, and more specifically frame structure 10 mounted on panel 20 with spring members 50 and flange members 30, 31, 40 and 41 facilitating the mounting.

According to the preferred embodiment frame structure 10 includes four flange members, two on each side at its bottom end as viewed in the drawings, however, it is to be understood that the invention also envisions two flange members, one on each side. In this event, the flange members would have to be wider and extend substantially across the entire width of the frame structure in order to stabilize the relay.

Flange members 30 and 31 are preferably spaced from each other and formed integrally with frame structure 10. Each includes a flat portion 34 and an adjoining beveled projection 32 as shown in FIGS. 2 and 3. The flat portion is spaced from projection 32 to define groove 39. The projection includes a beveled surface 32A which helps the relay to move laterally when pressure is applied axially. Furthermore, these two parts of the flanges rest against opposite sides of the panel.

Flange members 40 and 41, while also being formed integrally with the frame structure, and being in the same horizontal plane as flange members 30 and 31, extend from the opposite side and include sections 40A and 40B, and 41A and 41B respectively. The two sections are of different cross sections and as a result form shoulder 40C. Section 40A, according to the embodiment shown, includes depression 44 and comes to rest against the back side of panel 20.

Springs 50 are preformed and made of spring material, such as spring tempered crucible steel of .010 to .015 inch thickness for example. It is formed so as to be in two sections or portions with legs 51 and 52 connected together and legs 53 and 54 extending freely. The legs of one portion are at right angles to the legs of the other portion, and legs 53 and 54, because they extend freely and are resilient, compensate for any variation in the thickness of section 40B or in the spacing between edge 20A and shoulder 40C. In this connection, it is emphasized that without close tolerances required in the manufacture of the mounting arrangement its cost is reduced over an arrangement using screws and carefully aligned tapped holes.

Leg 53 has at its free end an offset portion 53A which cradles or locks edge 20A therein once the relay is snapped into position. The force that leg 53 exerts upon edge 20A prevents the relay from falling out, and also cushions the relay from a shock and vibration that may be effected upon the panel.

Legs 52 and 54 are pretensioned so that they clamp to portion 40A and tab 55 falls into depression 44. It should be apparent that while the tab is shown in the preferred embodiment it is not essential where a less positive attachment of the spring to the portion will suffice.

Edge 20B includes notches 20C of a width substantially the same as the width of the groove so that the relay can not be moved sideways. It should be clear that the notches can be excluded where a less positive mounting will suffice.

FIG. 4 shows the stages for mounting a relay to a panel in accordance with the invention. The relay is first inserted into an opening of the panel with its top side entering first. The relay is then tilted and edge 20A positioned against portion 53A of the spring. The relay then is moved laterally, or upward as viewed in the drawings, depressing the spring in such a way that leg 53 thereof is fully depressed. In this state, it is possible to move surface 32A past edge 20B and thereby upright the relay with respect to the panel. Human force can then be removed and the relay adjusts itself so that groove 39 receives notch 20C of edge 20B and the frame structure is supported at both sides for stability.

It should be appreciated that beveled surface 32A aids in moving the relay upward as an applied force at right angles would result in a certain amount of lateral movement due to the direction of a component force, and that the relay is actually snapped into position by virtue of the spring action.

Removal of the relay takes place merely by reversing the above steps, moving the relay laterally first and then axially.

FIG. 5 illustrates how a panel with but a few large openings can receive a row of relays or electromagnetic devices. Avoiding the need for many apertures is a reason why a reduction in manufacturing costs can be realized. Also the present scheme makes it possible for high density, constituting a feature important today in view of the emphasis placed an miniaturization and modular construction.

FIG. 5 also illustrates more clearly edge 20B with its notches 20C and how they receive projections 32 of flange members 30 and 31, and provide positive locking. In this connection, it should now be clear that the relay shown in FIGS. 2 and 3 can be positioned at any point along the opening in the panel.

The invention has been described in connection with a preferred embodiment however it is to be understood that there are numerous variations and changes that are within the spirit and scope of the invention as only defined by the appended claims.

What is claimed is:

1. A mounting arrangement for mounting an electromagnetic device on a panel having an opening with edges comprising in combination:

a frame structure having a top and bottom with at least two flange members extending in opposite directions from said bottom, one of said flange members having a groove therein for receiving an edge of said opening, and the other flange member having two sections of different cross sectional area with a shoulder therebetween and a spring with a portion clamped to one of said flange sections and another compressable portion having a crest and an adjacent offset which in combination forms a pocket for an opposite edge of said opening whereby said device is mounted on said panel.

2. A mounting arrangement for mounting an electromagnetic device on a panel having a front and back side and an opening with edges comprising in combination:

a frame structure having a top and substantially rectangular bottom, said bottom including flange members projecting from opposite sides thereof, said flange members on one side having a substantially flat first foot member and a projection with a beveled surface spaced therefrom to define a slot for an edge of said opening, said flange members on the opposite side having a second foot member for resting against the back side of said panel; and spring means mounted to said second foot member and constructed and arranged to hold an opposite edge of said opening and to allow for the mounting and removal of said device by moving said device first toward said panel and aligned with said opening and then in a lateral direction and vice versa respectively.

3. A mounting arrangement as claimed in claim 2 wherein said spring means comprises a two portion spring, one of said portions being attached to said second mentioned foot member, and the other portion having a free extending leg constructed and arranged to receive an opposite edge of said opening and to deflect sufficiently to enable said slot to receive said first mentioned edge whereby said device is mounted on said panel.

4. A mounting arrangement comprising:

a frame structure for an electromagnetic device having a substantially rectangular base with a first pair of feet and a second pair of feet, projecting from opposite sides thereof;

a panel having an opening for receiving said device at said feet, said opening having at least one edge with notches;

a pair of beveled surface projections of a predetermined width aligned with said first pair of feet and spaced therefrom to define a groove wherein said edge with notches is received, said notches being substantially the same width as said projection to prevent side movement of said device;

and a pair of springs having each a portion clamped to said second pair of feet and a compressable portion which in combination with said beveled surface projections enable the device to be snapped into position on said panel or vice versa.

References Cited by the Examiner

UNITED STATES PATENTS

| | | | |
|---|---|---|---|
| 2,466,141 | 7/1948 | Parsons | 200—168 |
| 2,798,271 | 7/1957 | Flora | 24—73 |
| 2,906,863 | 9/1959 | Ritter | 240—26 |
| 3,046,516 | 7/1962 | Tymkewicz | 339—126 |

CLAUDE A. LE ROY, *Primary Examiner.*

J. F. FOSS, *Assistant Examiner.*